US010129806B2

(12) United States Patent
McCann

(10) Patent No.: US 10,129,806 B2
(45) Date of Patent: Nov. 13, 2018

(54) METHOD TO ASSIGN IP TRAFFIC TO DESIRED NETWORK ELEMENTS BASED ON PACKET OR SERVICE TYPE

(71) Applicant: AT&T MOBILITY II LLC, Atlanta, GA (US)

(72) Inventor: John McCann, Downers Grove, IL (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 15/066,394

(22) Filed: Mar. 10, 2016

(65) Prior Publication Data
US 2017/0265116 A1    Sep. 14, 2017

(51) Int. Cl.
*H04W 36/22*  (2009.01)
*H04W 36/16*  (2009.01)
*H04W 36/30*  (2009.01)

(52) U.S. Cl.
CPC ......... *H04W 36/22* (2013.01); *H04W 36/165* (2013.01); *H04W 36/30* (2013.01)

(58) Field of Classification Search
CPC ..... H04W 88/06; H04W 36/14; H04W 36/30; H04W 36/0022; H04W 24/02;
(Continued)

(56) References Cited

U.S. PATENT DOCUMENTS 5,301,356 A    4/1994 Bodin et al.
6,501,737 B1   12/2002 Mathal et al.
(Continued)

FOREIGN PATENT DOCUMENTS

CN    103582149 A    2/2014
CN    102625459 B    8/2014
(Continued)

OTHER PUBLICATIONS

"From Voice over IP to Voice over LTE", NSN White paper, networks.nokia.com, Nov. 2013.
(Continued)

*Primary Examiner* — George Eng
*Assistant Examiner* — Jing Gao
(74) *Attorney, Agent, or Firm* — Guntin & Gust, PLC; Matthew Tropper

(57) ABSTRACT

Aspects of the subject disclosure may include, for example, determining a demand for real-time services to a first mobile device, by way of a base station of an LTE system. In response, utilization of a first wireless channel of a first radio of the base station is evaluated. The first radio supports a first wireless service that includes the real-time service and a non-real-time service to a second mobile device within the same cellular region. A handover of the second mobile device to a second radio of the base station is facilitated in response to the utilization. The second radio is configured to support a second wireless service that excludes the real-time service within the same cellular region. Responsive to the handover, the second radio supports the non-real-time service over the second wireless channel to the second mobile device within the cellular region. Other embodiments are disclosed.

20 Claims, 8 Drawing Sheets

(58) Field of Classification Search
CPC . H04W 48/18; H04W 24/10; H04W 36/0016; H04W 36/22; H04W 84/042; H04W 36/08; H04W 36/18; H04W 76/00; H04W 76/026; H04W 24/04; H04W 36/165; H04W 48/17; H04W 52/0229; H04W 74/006; H04W 76/041; H04L 65/1016; H04L 65/80; H04L 43/08
See application file for complete search history.

(56) References Cited

U.S. PATENT DOCUMENTS

| | | | |
|---|---|---|---|
| 7,103,371 | B1 | 9/2006 | Liu et al. |
| 8,280,028 | B1 | 10/2012 | Shusterman et al. |
| 8,433,329 | B2 | 4/2013 | Grote-Hahn et al. |
| 9,131,429 | B1 | 9/2015 | Bharadwaj |
| 2012/0327779 | A1 | 12/2012 | Gell et al. |
| 2013/0272121 | A1 | 10/2013 | Stanwood et al. |
| 2014/0162659 | A1* | 6/2014 | Aminaka ............ H04W 36/14 455/437 |
| 2014/0301262 | A1 | 10/2014 | Homchaudhuri et al. |
| 2015/0009874 | A1 | 1/2015 | Edara |
| 2015/0092544 | A1* | 4/2015 | De Pasquale ........ H04W 16/14 370/230 |
| 2015/0230267 | A1 | 8/2015 | Lee |
| 2015/0250016 | A1* | 9/2015 | Kotecha ............. H04W 76/064 370/329 |
| 2015/0282148 | A1 | 10/2015 | Le |
| 2016/0029349 | A1 | 1/2016 | Vargantwar |
| 2016/0277992 | A1* | 9/2016 | Cao ........................ H04W 48/18 |

FOREIGN PATENT DOCUMENTS

| | | |
|---|---|---|
| CN | 104394597 A | 3/2015 |
| CN | 104768228 | 7/2015 |
| EP | 2810516 A1 | 12/2014 |
| EP | 2966800 A1 | 1/2016 |
| KR | 101561514 B1 | 4/2009 |
| KR | 20150078961 | 12/2013 |
| WO | 2014016280 A1 | 1/2014 |
| WO | 2014131464 A1 | 9/2014 |
| WO | WO 2015112063 A1 * | 7/2015 .......... H04W 72/042 |
| WO | 2016014315 | 1/2016 |

OTHER PUBLICATIONS

Jo, Byungkab, "IISRA: Intercell interference separationbased resource allocation for VoLTE", Global Communications Conference (GLOBECOM), IEEE, 2014.

Keeley, Mike, "Deployment Challenges Await in VoLTE QoS User Equipment", Mobile Dev & Design, mobiledevdesign.com, Dec. 10, 2012.

* cited by examiner

200

300

400

METHOD TO ASSIGN IP TRAFFIC TO DESIRED NETWORK ELEMENTS BASED ON PACKET OR SERVICE TYPE

FIELD OF THE DISCLOSURE

The subject disclosure relates to a conservation of hardware in mobility networks that provide a real-time voice service.

BACKGROUND

A wireless communication network covers a certain geographic area by dividing the area into radio cells and each radio cell can be further divided into two or more sectors. Base stations, conceptually located at the center of respective cells/sectors, transmit information to a mobile communication device, also known as user equipment (UE), via downlink (DL) radio signals. Mobile communication devices transmit information to their serving base stations via uplink (UL) radio signals. A wireless communication network can be configured based on one of the number of wireless technology platforms, such as IS-95, CDMA2000 1×, EV-DO, UMB, GSM, WCDMA, HSPA (High-Speed Packet Access), LTE, WiMAX and WiFi wireless networks.

A real-time service, such as Voice over LTE (VoLTE), provides a carrier grade Voice over IP (VoIP) solution, built on an IP-Multimedia Sub System (IMS) architecture. In some applications, a native VoLTE client can be integrated into a design of a mobile communication device. Alternatively or in addition, a non-native VoLTE client can be provided by a third party and run on top of an application processor of the mobile communication device. Other general VoIP applications, such as Skype or Viber, sometimes referred to as over-the-top (OTT) VoIP applications, can also work over LTE radio, but generally without QoS support.

VoIP traffic is especially sensitive to modest network latency or packet loss, which can cause serious interruptions in a VoIP conversation. Accordingly, deployment of VoLTE requires a number of optimization steps to gain the full benefit of the technology's potential. Preferably, a success rate and retainability of a VoLTE call should match and exceed the level provided by circuit-switched connections.

Examples of key performance indicators (KPIs) in the radio network include setup success rate, handover success rate and call completion success rate. Network optimization includes parameter optimization and feature activation, such as header compression, Transmission Time Interval (TTI) bundling and QoS. Such features help to make VoLTE call reliability, quality and efficiency significantly higher than with OTT VoIP applications.

BRIEF DESCRIPTION OF THE DRAWINGS

Reference will now be made to the accompanying drawings, which are not necessarily drawn to scale, and wherein.

DETAILED DESCRIPTION

Figure 1:
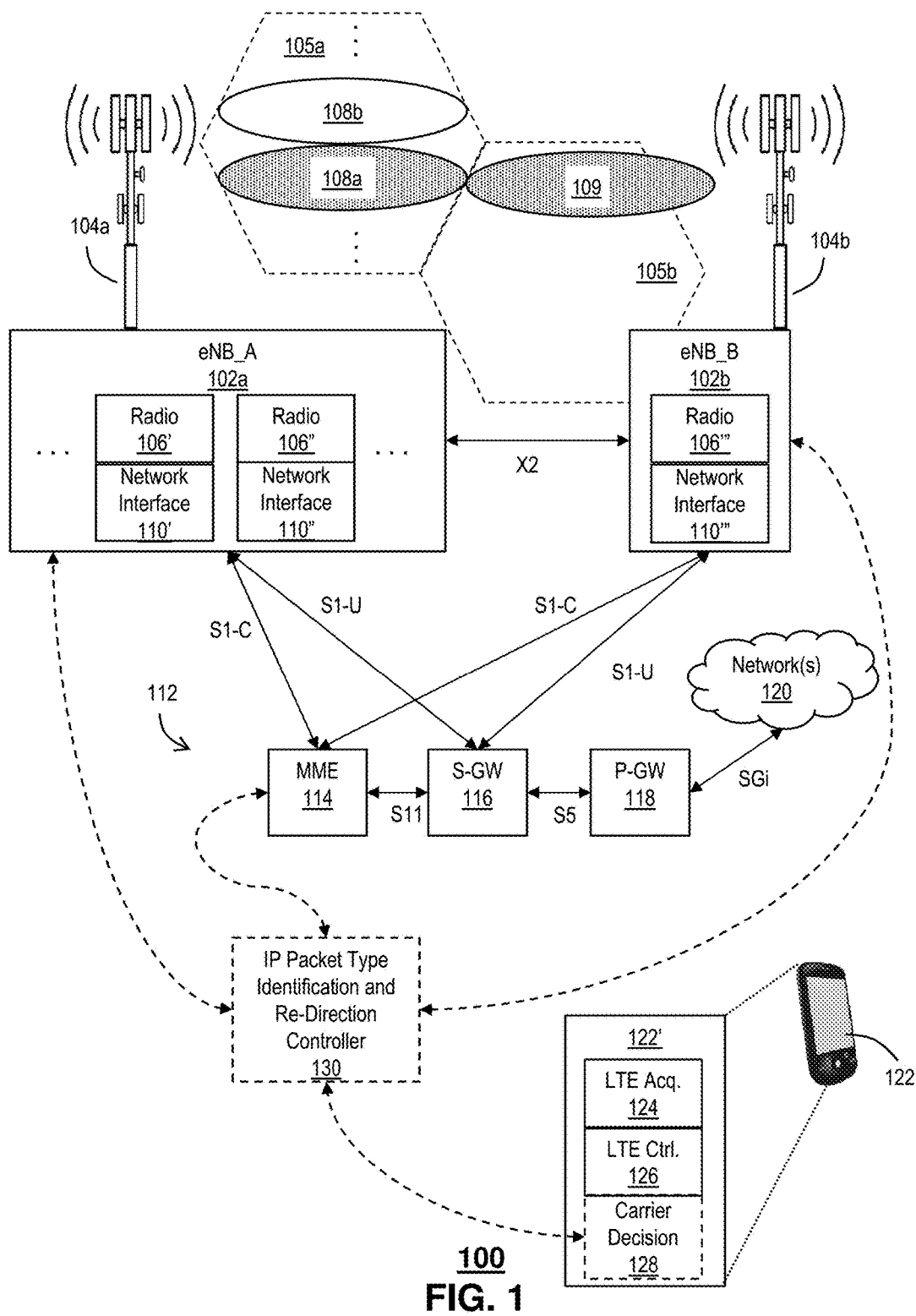
FIG. 1 depicts an illustrative embodiment of a wireless mobility network.

The subject disclosure describes, among other things, illustrative embodiments for consolidating allocations of real-time services, such as VoLTE, to a first radio of an evolved Node B (eNodeB or eNB) base station that facilitates real-time services to mobile communication devices in a cellular region. The first radio also facilitates non-real time services, such as data services. Mobile devices accessing the non-real time services and excluding real-time services can be transferred from the first radio to a second radio of the eNB. The second radio supports the non-real-time services, while excluding the real-time services to mobile communication devices within the same cellular region. The eNB can handover a first mobile communication device from the first radio to the second radio to transfer non-real time services within the same cellular region. Such handovers of some mobile devices free capacity of the first radio to accommodate other mobile devices accessing real-time services. Other embodiments are described in the subject disclosure.

One or more aspects of the subject disclosure include a process that detects a demand for VoLTE service to a first mobile device, by way of an eNB base station of an Evolved Universal Terrestrial Radio Access (E UTRA) radio. Utilization of a first wireless channel is evaluated for a first radio of the eNB. The first radio is configured to support a first wireless service over the first wireless channel that includes a VoLTE service within a cellular region. The first radio also provides a non-VoLTE service over the first wireless channel to a second mobile device within the cellular region. Responsive to the evaluating of the utilization of the first wireless channel, a handover is facilitated of the second mobile device to a second radio of the eNB. The second radio is configured to support a second wireless service that excludes the VoLTE service over a second wireless channel within the cellular region. Responsive to the handover, the second radio supports the non-VoLTE service over the second wireless channel to the second mobile device within the cellular region.

One or more aspects of the subject disclosure include a system that includes a processor and a memory that stores executable instructions. The executable instructions, when executed by the processor, facilitate performance of operations that include determining a request for a real-time service to a first mobile device, by way of an eNB base station of an E-UTRA radio access network. Responsive to the determining of the request for the real-time service, utilization is evaluated of a first wireless channel of a first radio of the eNB. The first radio is configured to support a first wireless service over the first wireless channel that includes the real-time service within a cellular region. The first radio provides a non-real-time service over the first wireless channel to a second mobile device within the cellular region. Responsive to the evaluating of the utilization of the first wireless channel, a handover is facilitated of the second mobile device to a second radio of the eNB. The second radio is configured to support a second wireless service that excludes the real-time service over a second wireless channel within the cellular region. Responsive to the handover, the second radio supports the non-real-time service over the second wireless channel to the second mobile device within the cellular region.

One or more aspects of the subject disclosure include a machine-readable storage medium, including executable instructions that, when executed by a processor, facilitate performance of operations. The operations include determining a demand for a real-time service to a first mobile device, by way of a base station of an LTE mobile network. Responsive to the determining of the demand for the real-time service, utilization is evaluated of a first wireless channel of a first radio of the base station. The first radio is configured to support a first wireless service over the first wireless channel that includes the real-time service within a cellular region. The first radio provides a non-real-time service over the first wireless channel to a second mobile device within the cellular region. Responsive to the evaluating of the utilization of the first wireless channel, a handover is facilitated of the second mobile device to a second radio of the base station. The second radio is configured to support a second wireless service that excludes the real-time service over a second wireless channel within the cellular region. Responsive to the handover, the second radio supports the non-real-time service over the second wireless channel to the second mobile device within the cellular region.

Conversational voice, e.g., VoLTE, can be treated as an application in the LTE network. Voice demonstrates a rather stable and predictable usage pattern. It is perceived that the growth in network usage of non-conversational voice applications, such as video, audio, and file transfer will outpace any growth related to VoLTE for the foreseeable future. Network users, particularly new and younger users, are comfortable with multiple ways to communicate beyond voice. A disproportionate growth of data traffic compared to a rather stable voice growth of voice traffic has been observed in recent trends. In some markets, non-VoLTE data services have been observed to outpace VoLTE by up to twenty times. Consequently, non-VoLTE IP traffic has been and is expected to be the dominant driver for mobile network growth, bandwidth expansion and additional hardware RF carriers.

Current VoLTE development strategies call for a deployment of the service across all RF carriers that are deployed. The more carriers deployed, the wider the distribution of voice packets becomes across all carriers. This results in each carrier hosting fewer and fewer voice packets. The consequence is the management of the voice call. There is a substantial cost associated with optimization of each new carrier for voice and data. Adding more carriers adds complexity to layer management for each carrier. Each new carrier also requires enhanced 9-1-1 (E911) service activation and optimization. All of this adds up to huge costs for an application that uses very little RF resources as compared to its available resources.

Radio performance has a direct impact on the cost of deploying the network in terms of the required number of base station sites and in terms of the transceivers required. The operator is interested in the network efficiency: how many customers can be served, how much data can be provided and how many base station sites are required. The efficiency is considered in link budget calculations and in capacity simulations. An end user application performance depends on the available bit rate, latency and seamless mobility. The radio performance defines what applications can be used and how these applications perform.

VoLTE relies upon the highest priority currently available, i.e., QCI=1, so it takes precedence over other data traffic. An apparent reason why voice has been provisioned over so many RF channels is because there is no technique to allow for VoLTE prioritization in the access layer. Thus, a congested cell might not "hear" a VoLTE request. The techniques disclosed herein, including reserving a minimum quantity of physical resource blocks (PRBs) to observe any VoLTE requests, thereby allowing VoLTE prioritization in the access layer. When a VoLTE request is acknowledged, the eNB can free-up channel resources to accommodate the VoLTE session. Data would either be slowed or pushed to a different carrier, or layer in a resource stack.

FIG. 1 depicts an illustrative embodiment of a wireless mobility network 100. The network 100 includes a first base station 102a in communication with a first antenna 104a that provides wireless coverage in a first cellular region 105a. The first cellular region 105a can be an entire cell, one or more sectors of a cell, or some other sub-region of the cell. E.g., a substantially circular, or hexagonal cell can be divided into three sectors, each spanning 120 degrees of non-overlapping coverage. The numbers of sectors as well as a diameter/radius of a cell generally depends on network planning Smaller cells with multiple sectors can be provided in dense urban environments to accommodate a greater number of mobile users, whereas larger cells with fewer sectors can be provided in rural areas with fewer mobile users. The network 100 includes at least a second base station 102b in communication with a second antenna 104b. The second antenna provides coverage in a second cell 105b. The second cell 105b can be overlapping, or adjacent to the first cell 105a, as shown.

In the illustrative example, the first base station 102a includes a first radio 106' and a second radio 106". The first radio 106' provides a first wireless coverage within the first cell 105a according to a first radio frequency (RF) spectral band 108a. The second radio 106" provides a second wireless coverage within the first cell 105a according to a second radio frequency (RF) spectral band 108b. Likewise, the second base station 102b includes a third radio 106'''. The third radio 106''' provides a wireless coverage within the second cell 105b according to a respective RF spectral band 109. The respective RF band 109 can be the same as the first RF spectral band 108a or the same as the second spectral band 108b of the first cell 105a. However, it is more likely that the respective RF spectral band 109 is different from either of the other RF spectral bands 108a, 108b according to frequency management practices. Such different bands can be selected to reduce a possibility of interference to either base station 102a, 102b and/or any mobile devices, sometimes referred to as user equipment (UE) 122 served within the corresponding cells 105a, 105b.

According to the techniques disclosed herein, the first radio 106' accommodates VoLTE service, whereas the second radio 106" does not. It can be said that the second radio 106" excludes VoLTE service, because the second radio 106" has not been optimized to accommodate such traffic. Consequently, all VoLTE traffic supported by the first base station 102a, must be supported by the first radio 106'. Any other service, such as data services can be accommodated by available capacity of the first radio 106' and/or by the second radio 106". As described in more detail below, the first radio 106' reserves capacity to detect any requests, demands or requirements for VoLTE service. Upon detection, other non-VoLTE traffic can be slowed and/or moved to the second radio 106" to generate sufficient capacity for the VoLTE traffic, and to reserve sufficient capacity to detect any further requests, demands or requirements for VoLTE service, e.g., in support of other mobile users.

The base stations 102a, 102b (generally 102) represent a Radio Access Network (RAN) portion of the network 100. The RAN, sometimes referred to as an air interface, implements radio access technology between a core network 112 and the UEs 122. In a $3^{rd}$ Generation Partnership Project (3GPP) LTE network 100, a RAN is referred to as an Evolved Universal Terrestrial Access Network (E-UTRAN), a base station 102 is referred to as an Evolved Node B (eNodeB or eNB) 102, and the core network 112 is referred to as an Evolved Packet Core (EPC) 112.

The EPC 112 can include several functional elements as disclosed in a general description of the E-UTRAN architecture, provided in 3GPP TS 36.401, Ver. 13.0.0, incorporated herein by reference in its entirety. For brevity, a subset of the functional elements, sometimes referred to as the "main LTE packet core elements" are illustrated in FIG. 1, including a Mobility Management Entity (MME) 114, a Serving Gateway (S-GW) 116 and a Packet Data Network (PDN) Gateway (P-GW) 118.

The MME 114 provides a control node responsible for features including tracking, paging, retransmissions, and for supporting an idle mode of UE 122. The MME 114 is also involved in bearer activation and its deactivation procedures, choosing the SGW 116 for a UE 122 in process of initial attach and when the intra-handover take place which involves a core network node relocation. The MME 114 without limitation, can also authenticate a user, handle Non-Access Stratum (NAS) signaling, and generate and allocate temporary UE identities. In at least some embodiments, the MME 1114 can manage UE roaming restrictions. MME is also termination point of ciphering and integrity protection for NAS signaling. Lawful Interception (LI) of signaling could be also supported by MME entity. It also provides the control plane function for mobility between LTE and 2G/3G networks by the S3 interface (from SGSN to MME).

The S-GW 116 terminates an interface towards E-UTRAN. For each UE 122 associated with the Evolved Packet Service (EPS) at a given point of time, there is a single S-GW 116. The S-GW 116 is responsible for handovers with neighboring eNB's 102, also for data transfer in terms of all packets across a user plane. The S-GW can provide a mobility interface to other networks such as 2G/3G, as well as providing monitoring and maintaining context information related to the UE 122 during its idle state and generates paging requests when arrives data for the UE 122 in downlink direction. (e.g., somebody's calling).

The P-GW 118 is a gateway that terminates an SGi interface towards a PDN 120. If a UE 122 is accessing multiple PDNs 120, there may be more than one P-GW 118 for that UE 122. The P-GW 118 provides an "anchor" point for mobility between 3GPP and non-3GPP technologies. The P-GW 118 also provides connectivity from the UE 122 to external the PDN 120 by being the point of entry or exit of traffic for the UE 122. The P-GW 188 manages policy enforcement, packet filtration for users, charging support and lawful intercept.

Each of the radios 106', 106", 106''' (generally 106) includes a respective network component, identified as a network interface 110', 110", 110''' (generally 110). The network interface 110 alone or in combination with the radio 106, implements one or more of the protocols of the E-UTRAN, such as media access control (MAC) protocols. Each radio 106 is tuned to a respective carrier frequency of an RF spectral band. The carrier frequency can reside in one of a number of available frequency bands, and can have an associated bandwidth, depending upon the application, the subscription, network resources, e.g., 650 MHz, 700 MHz, 850 MHz, 1700 MHz, 1900 MHz, 2.3 MHz, 3 MHz, 5 MHz, 10 MHz, 15 MHz, 20 MHz or any public band or future cellular band. The radio 106 can support downlink (DL) communications from the eNB 102 to the UE 122, as well as uplink (UL) communications from the UE 122 to the eNB 102. In at least some embodiments, the UL and DL communications use different modulation/multiplexing techniques. Namely, DL communications can include Orthogonal Frequency Division Multiplex (OFDM), whereas, UL communications can include Single Carrier—Frequency Division Multiple Access (SC-FDMA). An overall description of E-UTRAN is disclosed in GPP TS 36.300, Ver. 13.2.0, incorporated herein by reference in its entirety. A general description of the physical layer is disclosed in 3GPP TS 36.201, Ver. 13.0.0, incorporated herein by reference in its entirety. A general description of the UE radio transmission and reception is disclosed in 3GPP TS 36.101, Ver. 13.2.1, incorporated herein by reference in its entirety. It is to be understood that the techniques disclosed herein can be applied to any radio modulation currently know or future, including any FDD or TDD schemes.

An example of an embodiment of the UE 122 is shown in more detailed functional schematic of the UE 122'. The UE 122' includes an LTE acquisition module 124, an LTE control module 126 and in at least some embodiments, a carrier decision module 128 (shown in phantom). The LTE acquisition and control modules 124, 126 implement the protocols and features of the LTE network. The carrier decision module 128 can provide functionality to manage selection between multiple carriers and/or RF spectral bands of a common eNB 108. It is common practice to add capacity to a congested cell by adding additional radios 106. The radios 106 operate at different RF spectral bands within the same cell 105. In the illustrative example, the two radios 106', 106" respectively operate in the two different RF spectral bands 108a, 108b.

The network includes at least one control module 130 to facilitate allocation, access, management and/or servicing of mobile user traffic among the available radios 106', 106", 106'''. In some applications, the control module 130 can be referred to as a hardware conservation controller 130, because it allows for an efficient allocation of different grades of wireless service among different carrier frequencies providing overlapping coverage in proximity to a serviced UE 122. Namely, more costly and complex radios that support the highest QCI grades of service, including VoLTE are reserved for such services, while other less costly and less complex radios that support some QCI grades of service, but not the highest grade or grades of service, are configured to provide such lower-tier services. An example of a range of QCIs is provided in Table 1.

TABLE 1

Standardized QCIs for LTE.

| QCI | Resource type | Priority | Packet delay budget (ms) | Packet error loss rate | Example services |
|---|---|---|---|---|---|
| 1 | GBR | 2 | 100 | 10-2 | Conversational voice |
| 2 | GBR | 4 | 150 | 10-3 | Conversational video (live streaming) |
| 3 | GBR | 5 | 300 | 10-6 | Non-conversational video (buffered streaming) |
| 4 | GBR | 3 | 50 | 10-3 | Real-time gaming |
| 5 | Non-GBR | 1 | 100 | 10-6 | IMS signaling |
| 6 | Non-GBR | 7 | 100 | 10-3 | Voice, video (live streaming), interactive gaming |
| 7 | Non-GBR | 6 | 300 | 10-6 | Video (buffered streaming) |
| 8 | Non-GBR | 8 | 300 | 10-6 | TCP-based (for example, WWW, e-mail), chat, FTP, p2p |
| 9 | Non-GBR | 9 | 300 | 10-6 | file sharing, progressive video and others |

Figure 2:
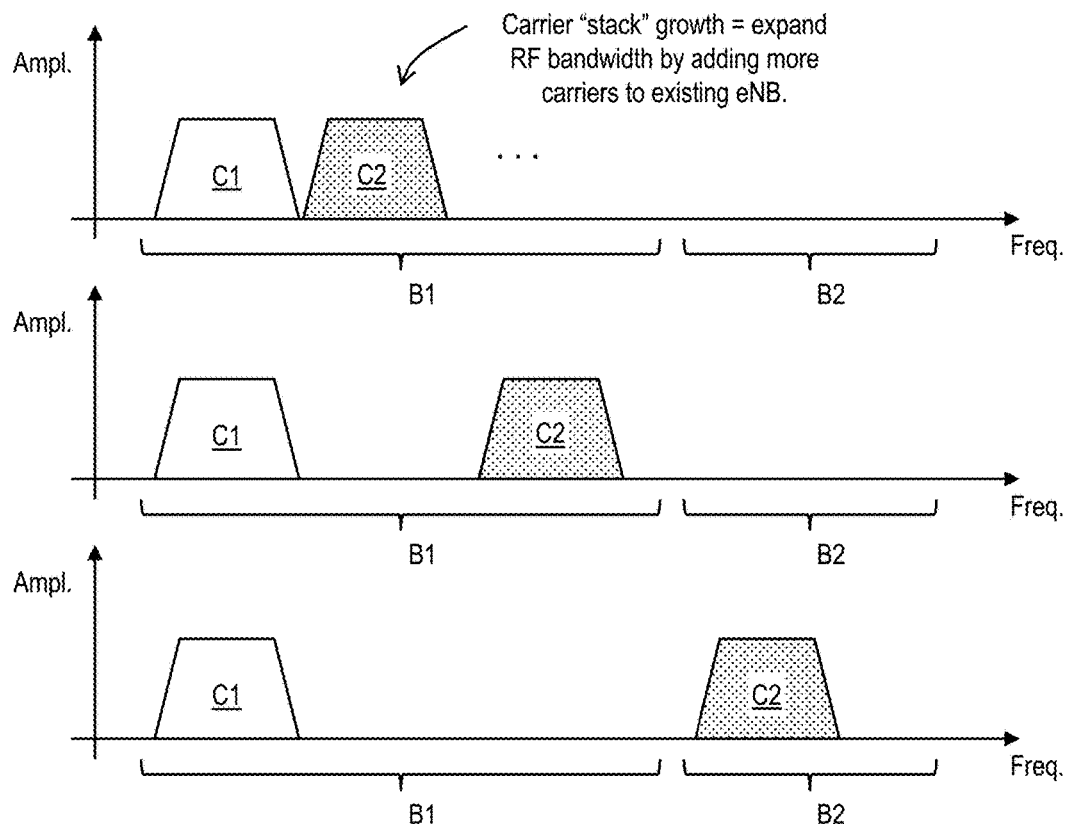
FIG. 2 depicts an illustrative embodiment of a radio frequency allocation of a base station of the wireless mobility network of FIG. 1.

FIG. 2 depicts an illustrative embodiment of a radio frequency allocation of a base station of the wireless mobility network of FIG. 1. A series of three graphs illustrate different spectral patterns as plots of signal amplitude, e.g., signal voltage, signal current, and/or signal power versus frequency. The frequency range includes a first band B1 and a second band B2. The frequency bands B1, B2 can be selected from available E-UTRA operating bands. A list of such bands is provided in Table 5.5-1 of 3GPP TS 36.101, ver. 10.3.0, Rel. 10, incorporated herein by reference in its entirety. Table 2, below, provides example bands.

TABLE 2

E-UTRA Operating Bands.

| E-UTRA operating bands | Uplink (UL) operating band BS receive/UE transmit FUL_low-FUL_high | BW (MHz) | Downlink (DL) operating band BS transmit/UE receive FDL_low-FDL_high | Duplex Mode |
|---|---|---|---|---|
| 1 | 1920 MHz-1980 MHz | 60 | 2110 MHz-2170 MHz | FDD |
| 2 | 1850 MHz-1910 MHz | 60 | 1930 MHz-1990 MHz | FDD |
| 3 | 1710 MHz-1785 MHz | 75 | 1805 MHz-1880 MHz | FDD |
| 4 | 1710 MHz-1755 MHz | 45 | 2110 MHz-2155 MHz | FDD |
| 5 | 824 MHz-849 MHz | 25 | 869 MHz-894 MHz | FDD |
| 6* | 830 MHz-840 MHz | 10 | 875 MHz-885 MHz | FDD |
| 7 | 2500 MHz-2570 MHz | 20 | 2620 MHz-2690 MHz | FDD |
| 8 | 880 MHz-915 MHz | 25 | 925 MHz-960 MHz | FDD |
| 9 | 1749.9 MHz-1784.9 MHz | 35 | 1844.9 MHz-1879.9 MHz | FDD |
| 10 | 1710 MHz-1770 MHz | 60 | 2110 MHz-2170 MHz | FDD |
| 11 | 1427.9 MHz-1447.9 MHz | | 1475.9 MHz-1495.9 MHz | FDD |
| 12 | 699 MHz-716 MHz | | 729 MHz-746 MHz | FDD |
| 13 | 777 MHz-787 MHz | | 746 MHz-756 MHz | FDD |
| 14 | 788 MHz-798 MHz | | 758 MHz-768 MHz | FDD |
| 15 | Reserved | | Reserved | FDD |
| 16 | Reserved | | Reserved | FDD |
| 17 | 704 MHz-716 MHz | | 734 MHz-746 MHz | FDD |
| 18 | 815 MHz-830 MHz | | 860 MHz-875 MHz | FDD |
| 19 | 830 MHz-845 MHz | | 875 MHz-890 MHz | FDD |
| 20 | 832 MHz-862 MHz | | 791 MHz-821 MHz | FDD |
| 21 | 1447.9 MHz-1462.9 MHz | | 1495.9 MHz-1510.9 MHz | FDD |
| ... | | | | FDD |
| 23 | 2000 MHz-2020 MHz | | 2180 MHz-2200 MHz | FDD |
| 24 | 1626.5 MHz-1660.5 MHz | | 1525 MHz-1559 MHz | FDD |
| 25 | 1850 MHz-1915 MHz | | 1930 MHz-1995 MHz | FDD |
| ... | | | | |
| 33 | 1900 MHz-1920 MHz | | 1900 MHz-1920 MHz | TDD |
| 34 | 2010 MHz-2025 MHz | | 2010 MHz-2025 MHz | TDD |
| 35 | 1850 MHz-1910 MHz | | 1850 MHz-1910 MHz | TDD |
| 36 | 1930 MHz-1990 MHz | | 1930 MHz-1990 MHz | TDD |
| 37 | 1910 MHz-1930 MHz | | 1910 MHz-1930 MHz | TDD |
| 38 | 2570 MHz-2620 MHz | | 2570 MHz-2620 MHz | TDD |
| 39 | 1880 MHz-1920 MHz | | 1880 MHz-1920 MHz | TDD |
| 40 | 2300 MHz-2400 MHz | 100 | 2300 MHz-2400 MHz | TDD |
| 41 | 2496 MHz 2690 MHz | | 2496 MHz 2690 MHz | TDD |
| 42 | 3400 MHz-3600 MHz | | 3400 MHz-3600 MHz | TDD |
| 43 | 3600 MHz-3800 MHz | | 3600 MHz-3800 MHz | TDD |

In the first graph, the first band B1 includes a first channel C1 adjacent to a second channel C2. The channels can have any of the available transmission bandwidths, such as those mentioned above. It should be appreciated that the channels C1 and C2 are not provisioned to the same specifications. Namely, the second channel C2 is configured to accommodate all QCI levels, including VoLTE, whereas the first channel C1 is configured to accommodate only a subset of possible QCI levels, particularly excluding at least the highest QCI level associated with VoLTE service. Thus, any VoLTE traffic must be directed to the second channel C2, while any such traffic must be excluded from the first channel C1.

In the first graph, the channels are contiguous, in that they are adjacent. In the second graph, the channels C1, C2 reside within the same band, B1, but are not contiguous. In the third graph, the channels C1 and C2 are not contiguous as they reside in different bands.

Figure 3:
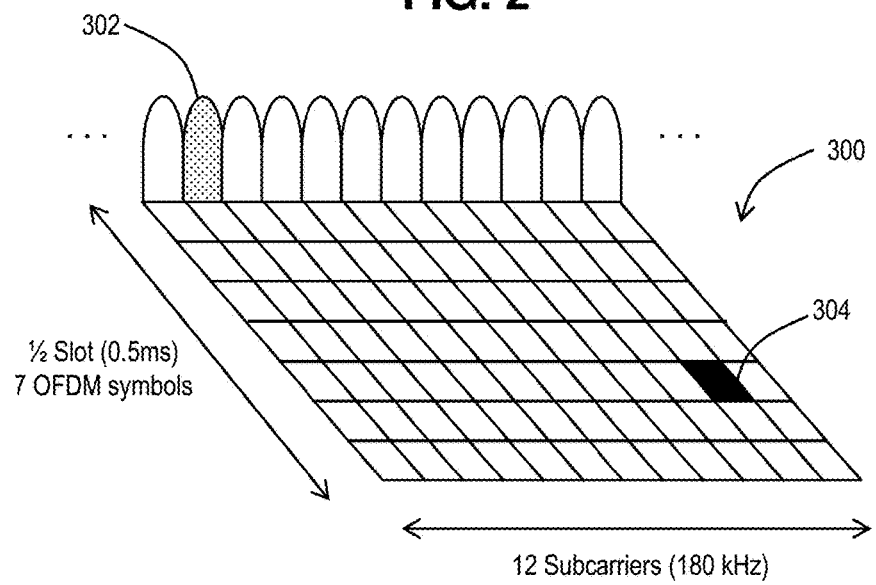
FIG. 3 depicts an illustrative embodiment of physical resource block of the wireless mobility network of FIG. 1.

FIG. 3 depicts an illustrative embodiment of Physical Resource Block (PRB) 300 of the LTE network of FIG. 1. The example PRB 300 includes a ½ slot, having a duration of 0.5 ms—a full slot would be 1 ms. The PRB 300 includes seven OFDM symbols for each of twelve different subcarriers 302. A particular OFDM symbol of a particular carrier is referred to as a resource element 304. It is understood that different numbers of subcarriers can be provided, depending upon available channel bandwidth. The twelve carriers occupy 180 kHz of bandwidth. By way of example, a 1.4 MHz channel can include up to 72 sub-carriers, providing up to six resource blocks per ½ time slot.

Figure 4:
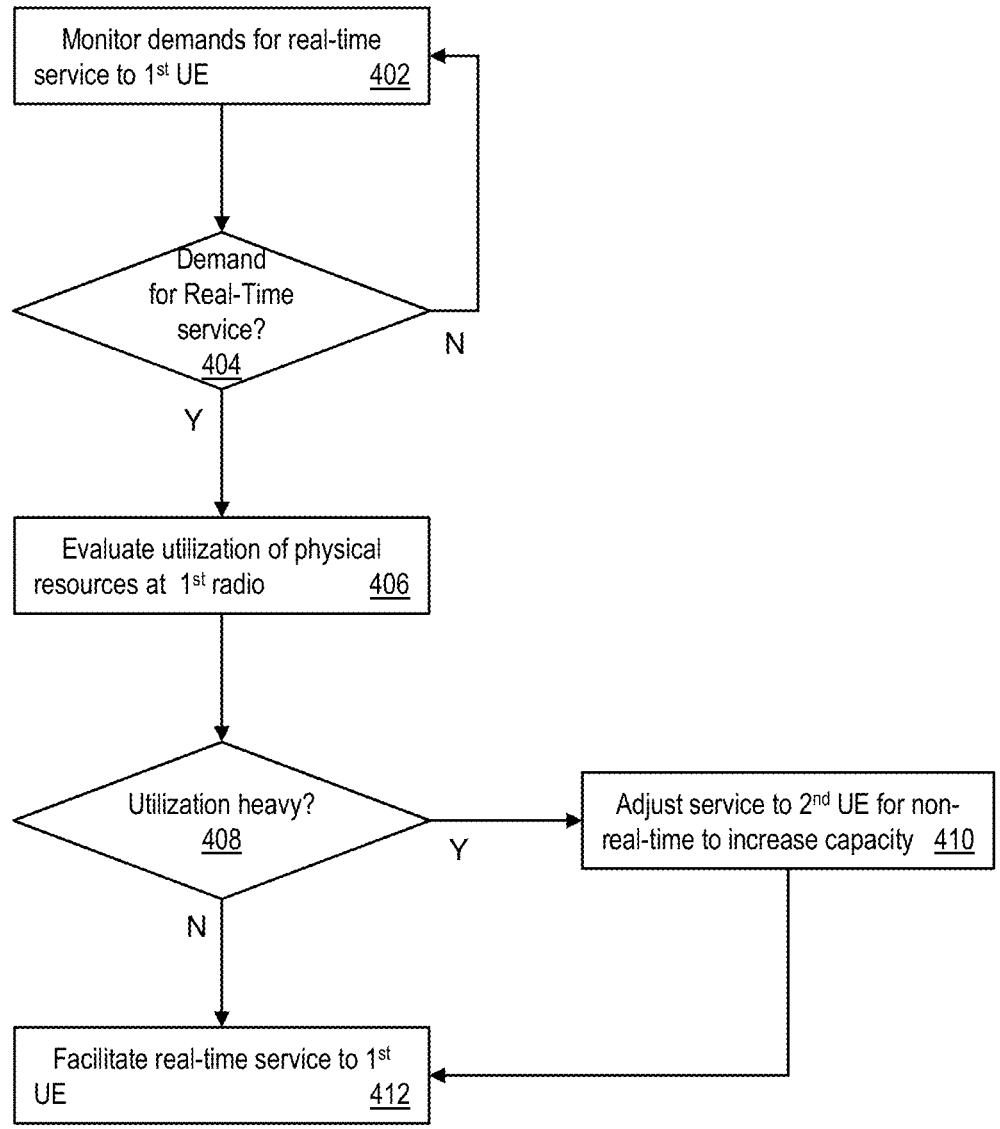
FIG. 4 depicts an illustrative embodiment of a process used in portions of the system described in FIG. 1.

FIG. 4 depicts an illustrative embodiment of a process 400 used in portions of the system described in FIG. 1. Demands for real-time service to a first mobile communication device are monitored at 402. For a system 100 (FIG. 1) including a first channel C1 (FIG. 2) that supports a real-time service and a second wireless channel C2 that supports non-real-time service, while excluding the real-time service, the system 100 can reserve at least a portion of a resource block 300 (FIG. 3) to accommodate any request for real-time service.

In general, a real-time service includes any service that sets limits on traffic flow requirements that include latency and/or jitter. By way of examples, requirements can include that latency and/or jitter be deterministic. Services can be determined based on supported applications, such as real-time voice and/or video applications. For example, a VoLTE call or session is an example of an application associated supported by a real-time service—the mobility network provides a dedicated bearer having a QoS and/or other features commensurate with the application/service.

The service may set latency and jitter requirements to support conversational voice. Although buffering may be applied, there are tolerable limits based on the conversational nature of the application, e.g., less than 250 msec or 500 msec. Other applications, such as video streaming, can be characterized as real time, e.g., when broadcasting live events, such as a live video conference, live television, and the like. Examples include, without limitation, messaging, teleconferencing and/or videoconferencing applications include Skype® and FaceTime®, gaming applications and the like. Examples of non-real-time applications can include file transfers, e.g., FTP, video and/or audio streaming, and the like. In some instances, characterization of an application as real-time or non-real-time can be loosely based on tolerable delay, jitter, etc. Thus, a media access service, such as network media broadcasts can be characterized as real-time, whereas video on demand service might not. Although the example embodiments include VoLTE sessions, it is to be understood that there are opportunities to implement similar redirections for other applications, such as streaming or video calls. As other real-time applications, such as real-time video conferencing becomes the norm, the optimization efforts will be directed to such applications. Accordingly, the techniques disclosed herein can be applied to provide an ability to shed other real-time traffic, such as non-real-time (video) IP sessions to specific network elements.

Monitoring continues at 402, until a demand for real-time service is detected at 404. In at least some embodiments, the demand for real-time service can be identified by a request for a radio resource connection (RRC) and an associated QCI indicative of the real-time service. For real-time conversational voice, e.g., VoLTE, a QCI value of 1 is definitive. Although the example embodiments disclose QCI as an indication of a real-time service, it is to be understood that other techniques can be employed, such as any DPI (deep packet inspection) techniques and/or predictive analytics to determine packet type. It is to be understood further that a detection mechanism can reside in one or more of various portions of a mobile communication system. For example, detection can be implemented at one or more of the UE (device level), the eNODE B (cell level) or the MME.

Once the request has been identified at 404, the process 400 continues by evaluating at 406, one of a utilization of a PRB 300 of the first wireless channel C1, a capacity of the PRB 300 of the first wireless channel C1 or both. To the extent it is determined from the evaluation that utilization is heavy, and/or capacity is low, the process continues by adjusting a service to a second mobile communication device at 410. The second mobile communication device is using at least a portion of the PRB 300 of the first wireless channel in association with a non-real time, and/or non-VoLTE service. Adjusting of the service can include moving the wireless service of the second mobile communication device to the second wireless channel C2. Alternatively or in addition, adjusting of the service can include a processing rate adjustment, or slowing of the non-VoLTE service of the second mobile communication device.

In some embodiments, load balancing can be applied. For example, in a load balancing scenario among cells that are operating at maximum capacity, each UE 122 reports its measurements to a base station 102a of its serving cell 105a in a periodic fashion. These measurements can include one or more of Signal to Noise and Interference Ratio (SNIR) measurements of a neighboring cell 102b as well as the serving cell 102a. For cells having a stacked arrangement of RF carriers or channels with the same cellular region, the measurements can include measurements for each RF carrier/channel. At any time and for any cell in the system if a capacity calculation is satisfied then the cell is considered to be congested, and a request load balance message is sent to the management entity.

In some embodiments, transition of wireless service to another channel, e.g., a second channel of the same base station serving the same cellular region, can be accomplished based on a handover process. In this instance, the source cell comprises the first channel C1 of the base station 102a, while the target cell comprises the second channel C2 of the base station 102b. After the transition, any portion of the PRB of channel C1 formerly servicing the second mobile communication device, would be available for one or more of providing the VoLTE service to the first mobile communication device and the spare capacity to detect subsequent requests for service, including requests for VoLTE service.

Once sufficient capacity on the first channel C1 to accommodate the requested VoLTE service, while maintaining overhead to detect subsequent requests, the VoLTE service can be established on the first channel C1 at 412.

In some embodiments, new attachments and/or handovers are accepted by a VoLTE carrier and excluded or otherwise blocked by a non-VoLTE carrier. Once attached, e.g., having established a standard RF bearer, non-VoLTE traffic can be moved to non-VoLTE carrier as a matter of course, or as needed, e.g., based on utilization/capacity.

Alternatively or in addition, new attachments and/or handovers are accepted by a non-VoLTE carrier and excluded or otherwise blocked by a VoLTE carrier. Once attached, e.g., having established a standard RF bearer, VoLTE traffic can be moved to a VoLTE carrier as a matter of course, or as needed, e.g., based on utilization/capacity.

Alternatively or in addition, new attachments and/or handovers are accepted by either of the VoLTE carrier or the non-VoLTE carrier. Once attached, e.g., having established a standard RF bearer, non-VoLTE traffic can be moved to non-VoLTE carrier as a matter of course, and VoLTE traffic can be moved to VoLTE carrier or as needed, e.g., based on request for service.

It is envisioned that in many situations the same UE being moved to/from non-VoLTE service will include multiple overlapping or simultaneous services. Consider a VoLTE service established by an incoming/outgoing call, while a user is streaming video from another application/source, such as YouTube®, a registered trademark of Google, Inc. of Mountain View, Calif. and/or audio from another application/source, such as Pandora®, a registered trademark of Pandora Media, Inc., of Oakland, Calif. In one approach, a decision to move a wireless communication device to another RF carrier and/or cell results in all wireless services being moved in a like manner. Alternatively, it is conceivable, that one or more services can be moved to another RF carrier/eNB, while others are not.

Figure 5:
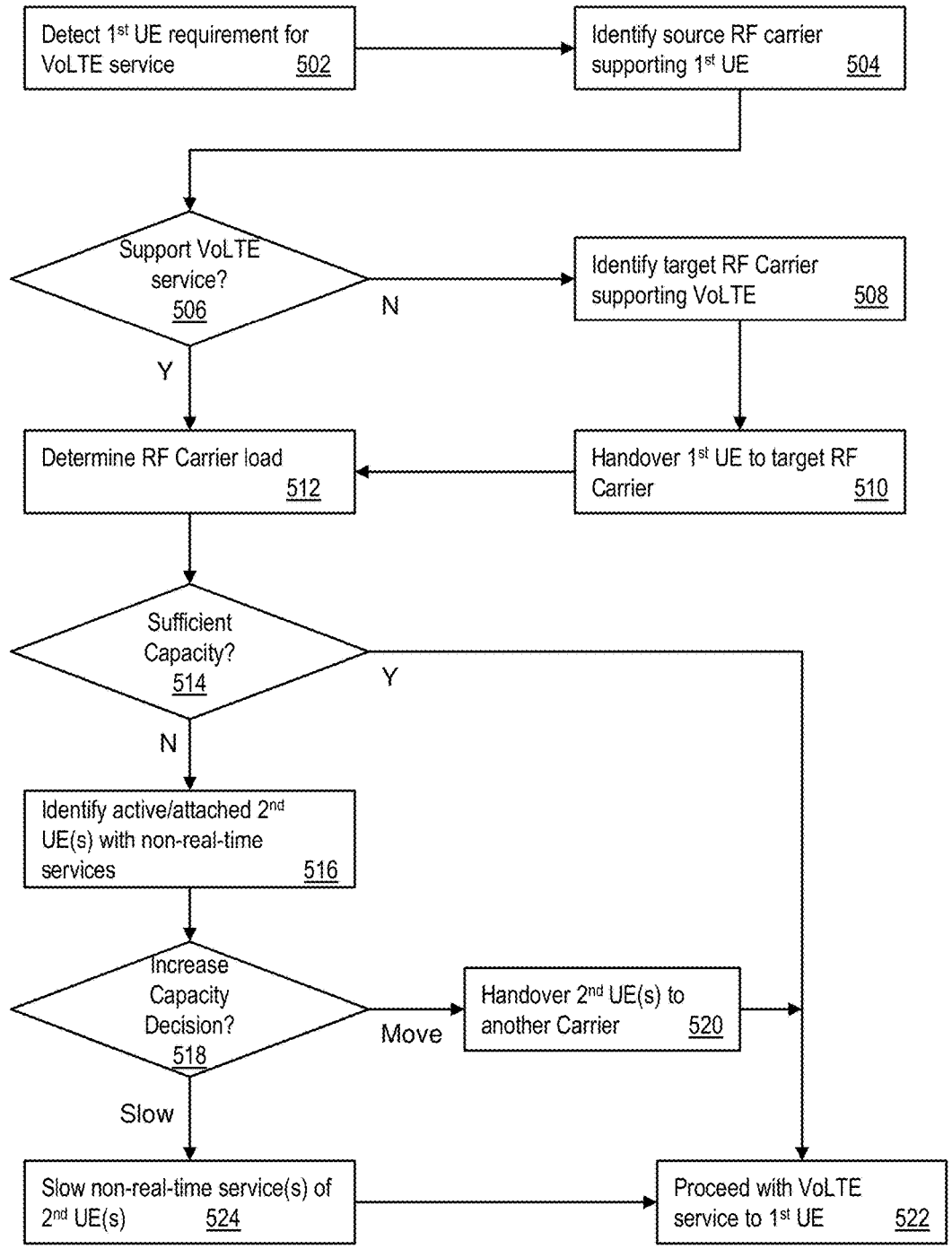
FIG. 5 depicts an illustrative embodiment of an alternative process used in portions of the system described in FIG. 1.

FIG. 5 depicts an illustrative embodiment of an alternative process 500 used in portions of the system described in FIG. 1. A requirement for VoLTE service at a first mobile communication device is detected or otherwise identified at 502. For example, this can include detection or identification of a radio resource request and/or a handover request that includes an indication of a VoLTE service. An indication of VoLTE service can include a QCI indicator having a value, e.g., "1", indicative of an appropriate level of service.

To the extent that the first mobile communication device is idle, active or otherwise attached to a source RF carrier, e.g., a source radio and/or wireless channel assignment, the source RF carrier can be identified at 504. Identification of the source RF carrier can be accomplished by one or more of the radio resource request, the handover request, or other indicator associated with the first mobile communication device. Alternatively or in addition, the source RF carrier can be identified by an initial attachment of the first mobile communication device.

Having determined that the source RF carrier supports a first UE at 504, a determination whether the source RF carrier supports the requested VoLTE service can be made at 506. By way of example, and without limitation, such a determination can be accomplished according to network configuration data or file that includes indicia of available services, service limitations or both for the source RF carrier. Such a table or file can be created and/or updated during network implementation, configuration and/or re-configuration. Such re-configurations can include those resulting from fault tolerant features, such as a failover of redundant radios.

To the extent that VoLTE service is not supported by the source RF carrier at 506, a target carrier that supports VoLTE can be identified at 508. Once a suitable target has been identified a handover or transfer of the first mobile communication device from the source RF carrier to the target RF carrier occurs at 510, and an associated load, utilization and/or capacity of the target RF carrier is determined at 512. To the extent that the VoLTE service is supported by the source RF carrier at 506, the associated load, utilization and/or capacity of the source RF carrier is determined at 512.

A determination whether the identified source or target RF carrier, evaluated at 512 includes sufficient capacity is made at 514. To the extent that the source/target RF carrier does have sufficient capacity, the system 100 proceeds with providing VoLTE service to the first mobile communication device. To the extent that the source/target RF carrier does not have sufficient capacity at 514, one or more other mobile communication devices that are active, idle or otherwise attached to the source/target RF carrier associated with non-VoLTE service or otherwise excluding any VoLTE service requirements, are identified at 516.

A decision is made at 518 as to whether capacity will be added by way of a moving/transfer or a processing speed adjustment. To the extent that a move/transfer is determined at 518, one or more of the second mobile communication devices are moved and/or transferred from the source/target RF carrier to another RF carrier at 520, and proceeding with VoLTE service to the first mobile communication device at 522. The other carrier can include a carrier that provides non-VoLTE service, while excluding any VoLTE service. A number of second mobile communication devices can be based on a required capacity of the requested VoLTE service, and resource allocations associated with the one or more second mobile communication devices.

To the extent that a processing speed adjustment is determined at 518, processing of wireless services of one or more of the second mobile communication devices are slowed or otherwise retarded at 524, and proceeding with VoLTE service to the first mobile communication device at 522. A number of second mobile communication devices to be slowed can be based on a required capacity of the requested VoLTE service, and resource allocations associated with the one or more second mobile communication devices. Slowing of the processing can be accomplished by any suitable means, including adjusting an allocation of PRBs, e.g., reducing the allocation of PRBs to effectively slow processing of the one or more of the second mobile communication devices.

In some embodiments, a decision to move and/or slow the one or more second mobile communication devices can be based on a preference to affect the fewest or least number of second mobile communication devices. Thus, a decision to move/slow one device to free capacity on the first RF channel is preferable over any decision to move/slow more than one device. In some embodiments, this decision can be made without regard to parameters associated with one or more of the second communication devices and/or the associated wireless services. For example, the decision can be made without regard to QCI, priority, and the like.

Alternatively, a decision to move/slow the one or more second mobile communication devices can be based on affecting those devices associated with wireless services having the lowest QCI level, the lowest priority, or the like.

It is conceivable that two or more of the second mobile communication devices associated with services of a relatively low QCI can be moved over a single one or fewer number of the second mobile communication devices having a greater QCI.

Alternatively or in addition, a decision on selecting which of the second mobile communication devices to move/slow can be based on other factors, such as a level of subscription (a higher subscription fee or level of services would be less likely to be relocated/slowed than a lower subscription fee/level of service). Still other factors can include one or more of historical records, predictions, randomizations, and fairness. Fairness, for example, can be used to select one of the second communication devices over another based on prior moves/processing speed adjustments—a device that has been previously moved/slowed may be less/more likely to be moved based on prior moves. A historical window can be based on one or more of network lifetime, mobile communication device lifetime a predetermined time interval, such as hours, days, weeks, and so forth. Alternatively or in addition, a historical window can be based on an event, such as an attachment interval, service activation/deactivation, idle transitions and the like.

A determination is made at 506 as to whether the VoLTE service can be supported. To the extent that the VoLTE service can be supported, an RF carrier load is determined at 512. To the extent that the VoLTE service cannot be supported, a target RF Carrier supporting VoLTE is identified at 508. Handover of the first UE to a target RF Carrier occurs at 510, and RF carrier load is determined at 512.

Determine whether there is sufficient capacity at 514. To the extent that sufficient capacity exists, proceed with VoLTE service to first UE at 522. It is understood that in at least some embodiments, sufficient capacity includes capacity for the requested VoLTE service as well as spare capacity to monitor or otherwise detect any subsequent requests for service, including requests for VoLTE services, e.g., by another UE.

To the extent that sufficient capacity does not exist at 514, identify one or more attached, active and/or idle second UE(s) associated with non-real-time services at 516. A decision is made at 518 as to whether an increase capacity exists. To the extent that an increase capacity exists at 518, one or more of the second UE(s) are handed over to another carrier at 520, and proceed with VoLTE service to the first UE at 522.

To the extent that an increase capacity does not exist at 518, one or more second UE(s) are slowed at 524, while keeping at least one of the one or more second UEs on the at 520, and proceed with VoLTE service to the first UE at 522.

Referring again to FIG. 1, in some embodiments, the hardware conservation controller 130 can be included within the source eNB 102a. The controller 130 can monitor utilization of wireless carriers at the source eNB 102a. The controller can identify demand for service based on protocol exchanges with the UE 122.

In some embodiments, the hardware conservation controller 130 can be included within the destination eNB 102a or 102b. The controller 130 can monitor utilization of wireless carriers at the source eNB 102a, e.g., through messages exchanged between the source eNB 102a and the target eNB 102a, 102b, e.g., by way of an X2 interface between the eNBs 102a, 102b, and/or an internal interface of the same eNB 102a. The controller 130 can identify demand for service based on protocol exchanges with one or more of the UE 122 and the destination eNB 102a, 102b.

In some embodiments, the hardware conservation controller 130 can be included in one or more of the functional modules 114, 116, 118 of the EPC 112. Once again, the controller 130 can monitor utilization of wireless carriers at the source eNB 102a, e.g., through messages exchanged between the source eNB 102a and/or the target eNB 102a, 102b, e.g., by way of standard interfaces between the eNBs 102a, 102b and the functional modules of the EPC 112.

In some embodiments, the hardware conservation controller 130 can be provided by another module, such as a separate or standalone server in communication with one or more of the eNB 102a, 102b, the EPC 112 and/or the UE 122. For example, a server implementation of the controller 130 can be collocated at the EPC 112 and/or remote and accessible by way of a network connection, such as the packet data network 120.

In some embodiments, the radio 106 providing the non-real-time wireless service to the exclusion of real-time wireless voice service can be provided without any E911 service; whereas, the radio providing the real-time voice services does provide the E911 service.

It is understood that the techniques disclosed herein can be applied, without restriction, to any of the example bandwidth and channel configurations. Conversational voice generally requires UL and DL. Any of the techniques disclosed herein can be based on or otherwise applied to one of the UL, the DL or a combination of the UL and DL.

While for purposes of simplicity of explanation, the respective processes are shown and described as a series of blocks in FIGS. 4-5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 6:
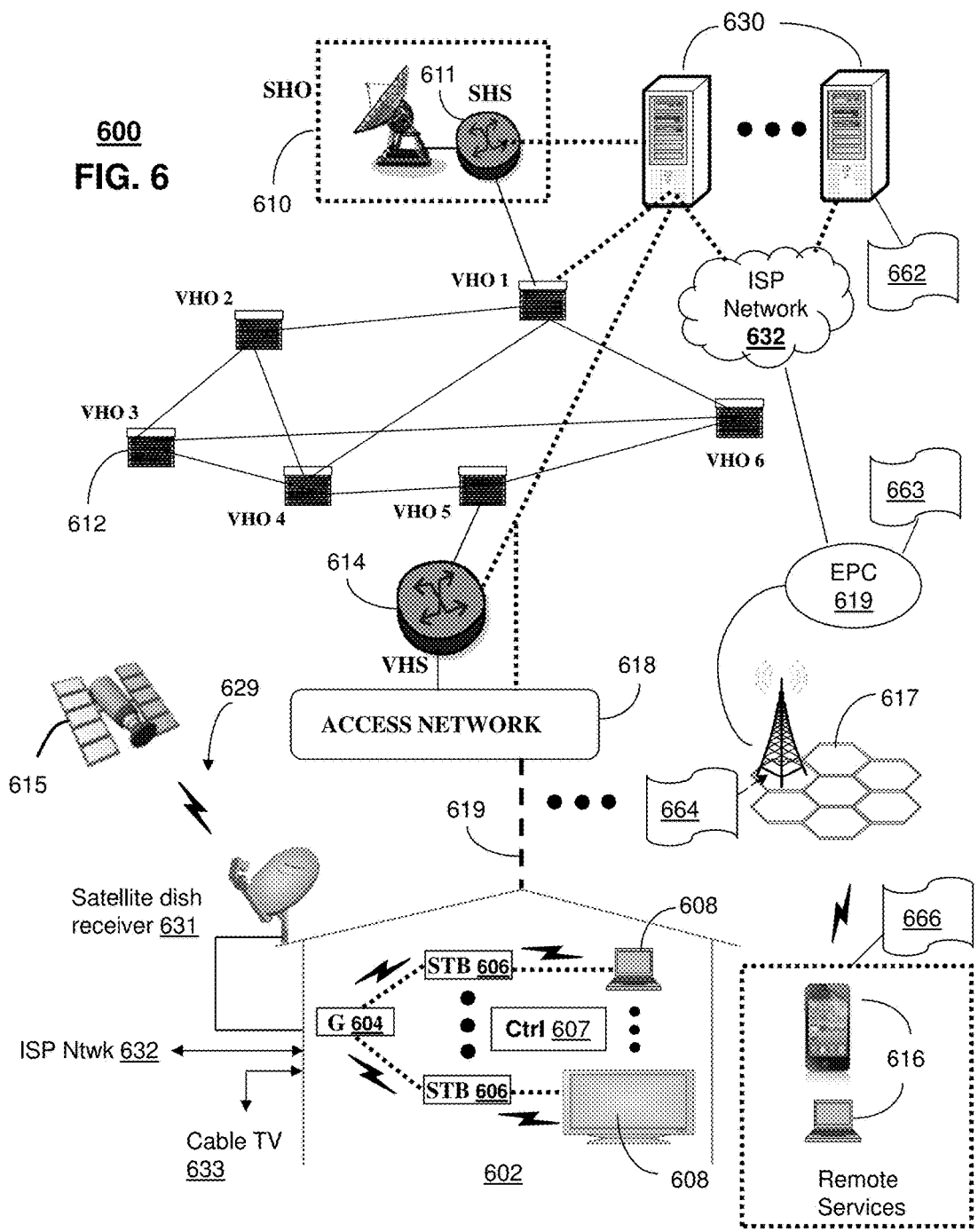
FIGS. 6-7 depict illustrative embodiments of communication systems that provide media services, including services to mobile devices of the wireless mobility network of FIGS. 1-3.

FIG. 6 depicts an illustrative embodiment of a first communication system 600 for delivering media content. The communication system 600 can represent an Internet Protocol Television (IPTV) media system. Communication system 600 can be overlaid or operably coupled with reference to the wireless mobility network 100-300 of FIGS. 1, 2 and/or 3 as another representative embodiment of communication system 600. For instance, one or more devices illustrated in the communication system 600 of FIG. 6 can determine a demand for real-time services to a first UE 122 (FIG. 1), by way of an eNB 102 of an LTE system 100. In response, a utilization of a first wireless channel C2 (FIG. 3) of a first radio 106a of the base station 102a is evaluated. The first radio 106a supports a first wireless service that includes the real-time service, such as VoLTE, and a non-real-time service to a second mobile device within the same cellular region. A handover of the second mobile device to a second radio 106b of the base station 102a is facilitated in response to the utilization. The second radio 106b is configured to support a second wireless service that excludes the real-time service within the same cellular region 105a. Responsive to the handover, the second radio 106b supports the non-real-time service over the second wireless channel to the second mobile device within the cellular region 105a.

The IPTV media system can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services. System 600 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as a hardware conservation controller (herein referred to as controller 630). The controller 630 can use computing and communication technology to perform function 662, which can include among other things, the hardware consolidating techniques described by processes 400 and/or 500 of FIGS. 4-5. For instance, function 662 of the controller 630 can be similar to the functions described for the controller 130 of FIG. 1 in accordance with the processes 400 and/or 500. The wireless communication devices 616 can be provisioned with software function 666, to utilize the services of the controller 630. For instance, functions 666 of the wireless communication devices 616 can be similar to the functions described for the communication devices 122 of FIG. 1 in accordance with the processes 400 and/or 500 of FIGS. 4-5.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
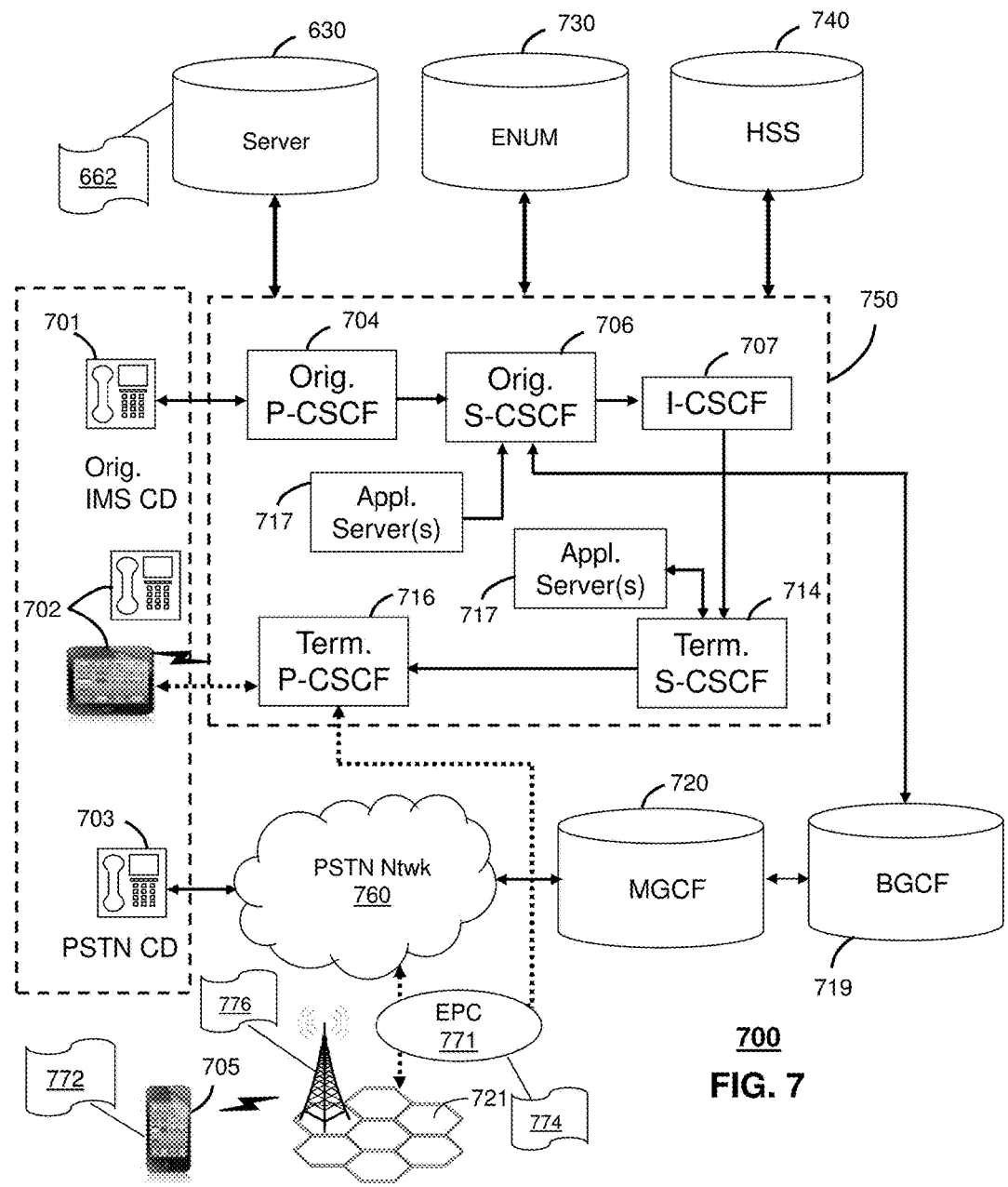

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with system 100 of FIG. 1 and communication system 600 as another representative embodiment of communication system 600. A controller 630 can determine a demand for real-time services to a first UE 705, by way of an eNB of an LTE system 721. In response, a utilization of a first wireless channel C2 (FIG. 3) of a first radio 106*a* of the base station 102*a* is evaluated. The first radio 106*a* supports a first wireless service that includes the real-time service, such as VoLTE, and a non-real-time service to a second mobile device within the same cellular region. A handover of the second mobile device to a second radio 106*b* of the base station 102*a* is facilitated in response to the utilization. The second radio 106*b* is configured to support a second wireless service that excludes the real-time service within the same cellular region 105*a*. Responsive to the handover, the second radio 106*b* supports the non-real-time service over the second wireless channel to the second mobile device within the cellular region 105*a*.

Communication system 700 can comprise a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (aSs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The controller 630 of FIG. 6 can be operably coupled to communication system 700 for purposes similar to those described above. The controller 630 can perform function 662 and thereby provide hardware consolidations services to the CD 705 of FIG. 7 similar to the functions described for the controller 130 of FIG. 1 in accordance with processes 400 and/or 500 of FIGS. 4-5. CD 702, which can be adapted with software to perform function 772 to utilize the services of the controller 630 similar to the functions described for communication device 122 of FIG. 1 in accordance with processes 400 and/or 500 of FIGS. 4-5. The controller 630 can be an integral part of the evolved packet core 771 performing function 774, which can be substantially similar to function 663 and adapted to the operations of the IMS network 750.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3' Generation Partnership Project (3GPP). It is further noted that some or all embodiments of the subject disclosure may in whole or in part modify, supplement, or otherwise supersede final or proposed standards published and promulgated by 3GPP.

Figure 8:
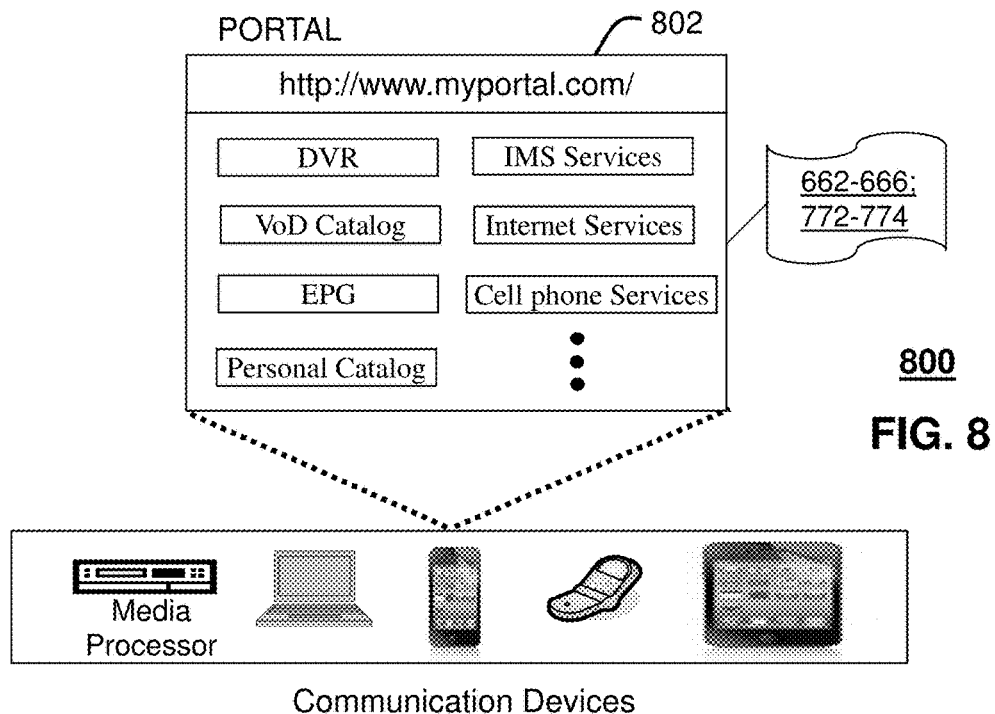
FIG. 8 depicts an illustrative embodiment of a web portal for interacting with the communication systems of FIGS. 1-3 and 6-7.

FIG. 8 depicts an illustrative embodiment of a web portal 802 of a communication system 800. Communication system 800 can be overlaid or operably coupled with systems 100 of FIG. 1, communication system 600, and/or communication system 700 as another representative embodiment of the system 100 of FIG. 1, communication system 600, and/or communication system 700. The web portal 802 can be used for managing services of the system 100 of FIG. 1 and communication systems 600-700. A web page of the web portal 802 can be accessed by a Uniform Resource Locator (URL) with an Internet browser using an Internet-capable communication device such as those described in FIG. 1 and FIGS. 6-7. The web portal 802 can be configured, for example, to access a media processor 606 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 802 can also be used for provisioning IMS services described earlier, provisioning Internet services, provisioning cellular phone services, and so on.

The web portal 802 can further be utilized to manage and provision software applications 662-666, and 772-776 to adapt these applications as may be desired by subscribers, operators and/or service providers of the system 100 of FIG. 1, and communication systems 600-700. For instance, users of the services provided by the controller 130 or controller 630 can log into their on-line accounts and provision the controller 130 or controller 630 with user profiles, eNB profiles, provide contact information to the controller to enable it to communication with devices described in FIGS. 1-7, and so on. Service providers can log onto an administrator account to provision, monitor and/or maintain the systems 100 of FIG. 1 or server 630.

Figure 9:
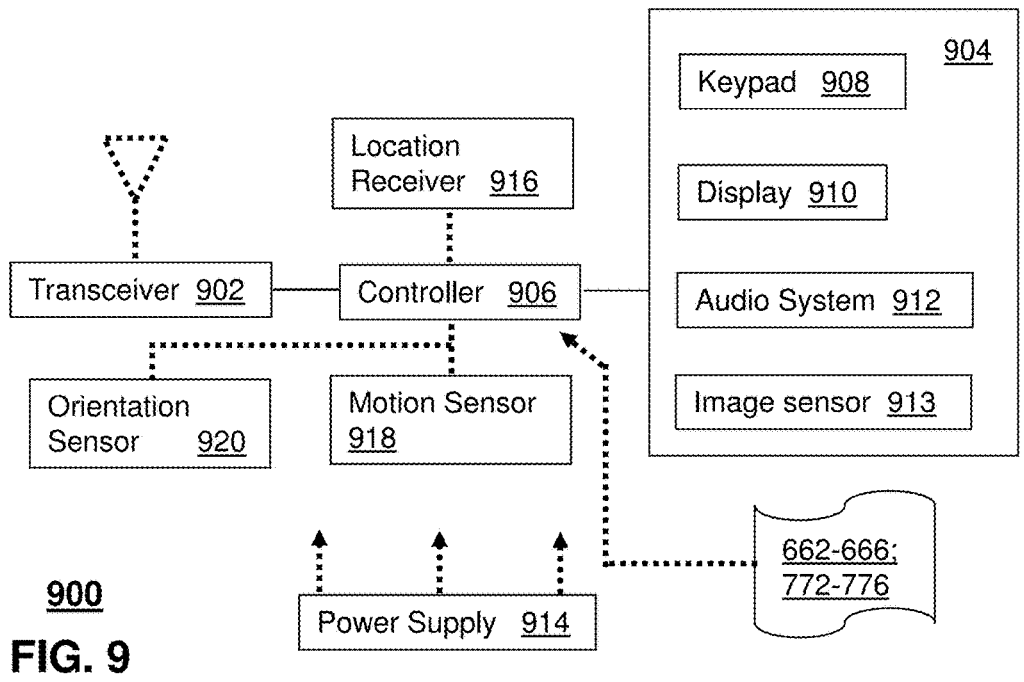
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIG. 1, and FIGS. 6-7 and can be configured to perform portions of the processes 400 and/or 500 of FIGS. 4-5.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of devices of FIG. 1, the media processor 606, the media devices 608, or the portable communication devices 616 of FIG. 6, as well as the IMS CDs 701-702 and PSTN CDs 703-705 of FIG. 7. It will be appreciated that the communication device 900 can also represent other devices that can operate in system of FIG. 1, communication systems 600-700 of FIGS. 6-7 such as a gaming console and a media player. In addition, the controller 906 can be adapted in various embodiments to perform the functions 662-666 and 772-776, respectively.

Upon reviewing the aforementioned embodiments, it would be evident to an artisan with ordinary skill in the art that said embodiments can be modified, reduced, or enhanced without departing from the scope of the claims described below. For example, resources of an RF carrier that supports VoLTE can be freed by transitioning one or more of the second mobile communication devices to another wireless mobile technology and/or radio access technology. This might include falling back from LTE to services generally associated with Cellular technologies can include, for example, IS-95, CDMA2000 1x, CDMA-1x, UMTS/HSDPA, GSM/GPRS, TDMA/EDGE, EV/DO, UMB, WiMAX, SDR, GSM, WCDMA, HSPA (High-Speed Packet Access) and WiFi. Other embodiments can be used in the subject disclosure. Such a move to another radio access technology can be accomplished alone or in combination with a slowing/moving of the second mobile communication devices to another LTE carrier. It is to be understood that the techniques disclosed herein are not limited to the disclosed embodiments. For example, the techniques can be applied to future technologies, such as LTE Advanced and/or 5G networks.

By way of further example, one or more of the first and second base stations, the first and second RF carrier can include a Heterogeneous Network (HetNet). A HetNet is a mix of high power macro-eNBs and low-power micro/Pico/Femto/relay base stations that are deployed for incremental capacity growth and coverage enhancement.

Macrocells are conventional base stations with power about 20 W, that use dedicated backhaul, are open to public access and range is about 1 km to 20 km. Microcells provide additional coverage and capacity in areas where there are high numbers of users, for Example, urban and suburban areas. Some microcells cover about 10% of the area of a Macrocell. Microcells are base stations with power between about 1 to 5 W that use a dedicated backhaul and are open to public access, with a range of about 500 m to 2 km.

Picocells provide more localized coverage, and are generally found inside buildings where coverage may be poor, or where there is a dense user population. The power range is from about 50 mW to about 1 W, with dedicated backhaul connections. Picocells are usually open to public access with a range of about 200 m or less. A femtocell is a base station that allows mobile phone users to make calls from inside their homes via their Internet broadband connection.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
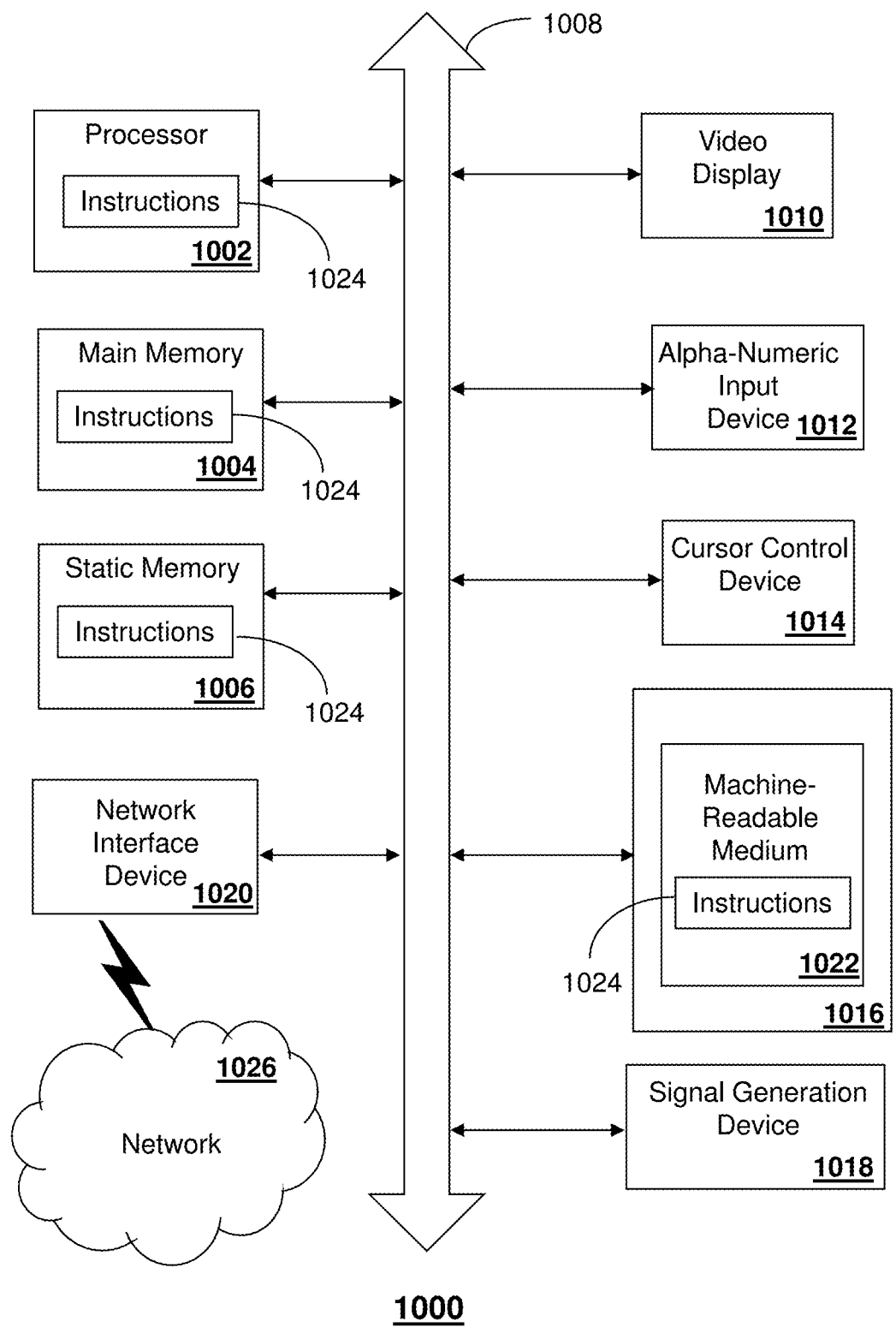
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the controller 630, the eNB 606, a device in the evolved packet core 619, 771, such as an MME 114 and/or a S-GW 116 and other devices of FIGS. 1 and 6-7. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

detecting, by a system comprising a processor, a demand for Voice over Long Term Evolution (VoLTE) service to a first mobile device, by way of an evolved Node B (eNB) base station of an Evolved Universal Terrestrial Radio Access (E-UTRA) radio access network, wherein the demand for the VoLTE service is detected according to determination of packet type;

responsive to the detecting of the demand for the VoLTE service, evaluating, by the system, a utilization of a first wireless channel of a first radio of the eNB base station, wherein the first radio facilitates support of a first wireless service over the first wireless channel that includes the VoLTE service within a cellular region, wherein the first radio provides a non-VoLTE service over the first wireless channel to a plurality of mobile devices within the cellular region, and wherein the evaluating of the utilization of the first wireless channel comprises identifying a physical resource block allocation associated with one or more non-VoLTE mobile devices of the plurality of mobile devices;

responsive to the evaluating of the utilization of the first wireless channel, selecting, by the system, one of the one or more non-VoLTE mobile devices as a selected mobile device; and responsive to the evaluating of the utilization of the first wireless channel, facilitating, by the system, a handover of the selected mobile device to a second radio of the eNB base station, wherein the second radio facilitates support of a second wireless service that excludes the VoLTE service over a second wireless channel within the cellular region, and wherein, responsive to the handover, the second radio supports the non-VoLTE service over the second wireless channel to the selected mobile device within the cellular region.

2. The method of claim 1, further comprising:

identifying, by the system, a portion of the physical resource block allocation associated with another mobile device of the one or more non-VoLTE mobile devices; and reducing, by the system, the portion of the physical resource block allocation associated with the another mobile device of the one or more non-VoLTE mobile devices to obtain a modified physical resource block allocation, wherein the modified physical resource block allocation comprises an increase in available capacity of the first wireless channel to support a provision of the VoLTE service to the first mobile device.

3. The method of claim 1, further comprising:

determining, by the system, a capacity based on an utilization of the first wireless service over the first wireless channel; and determining, by the system, that the capacity is insufficient to satisfy the demand for the VoLTE service to the first mobile device, wherein the handover of the selected mobile device to the second radio increases the capacity of the first wireless channel to support a provision of the VoLTE service to the first mobile device.

4. The method of claim 1, further comprising reserving a portion of a physical resource block of the first wireless channel of the first radio to accommodate other demands for VoLTE service.

5. The method of claim 1, wherein the second radio does not support an enhanced 911 emergency service to any mobile devices within the cellular region.

6. The method of claim 1, wherein the first mobile device comprises a cellular phone.

7. The method of claim 1, wherein at least one of the one or more non-VoLTE mobile devices comprises a tablet.

8. A system comprising:

a processor; and a memory that stores executable instructions that, when executed by the processor, facilitate performance of operations, the operations comprising:

determining a demand for real-time service to a first mobile device, by way of an evolved Node B (eNB) base station of an Evolved Universal Terrestrial Radio Access (E- UTRA) radio access network, wherein the demand for the real-time service is determined according to determination of packet type;

responsive to the determining of the demand for the real-time service, evaluating a utilization of a first wireless channel of a first radio of the eNB base station, wherein the first radio facilitates support of a first wireless service over the first wireless channel that includes the real-time service within a cellular region, wherein the first radio provides a non-real-time service over the first wireless channel to a plurality of mobile devices within the cellular region, and wherein the evaluating of the utilization of the first wireless channel comprises identifying a physical resource block allocation associated with one or more non-real-time mobile devices of the plurality of mobile devices; and responsive to the evaluating of the utilization of the first wireless channel, selecting one of the one or more non-real-time mobile devices as a selected mobile device; and responsive to the evaluating of the utilization of the first wireless channel, facilitating a handover of the selected mobile device to a second radio of the eNB base station, wherein the second radio facilitates support of a second wireless service that excludes the real-time service over a second wireless channel within the cellular region, and wherein, responsive to the handover, the second radio supports the non-real-time service over the second wireless channel to the selected mobile device within the cellular region.

9. The system of claim 8, wherein the operations further comprise:
identifying a portion of the physical resource block allocation associated with another mobile device of the one or more non-real-time mobile devices; and
reducing the portion of the physical resource block allocation associated with the another mobile device of the one or more non-real-time mobile devices to obtain a modified physical resource block allocation, wherein the modified physical resource block allocation comprises an increase in available capacity of the first wireless channel to support a provision of the real-time service to the first mobile device.

10. The system of claim 8, wherein the operations further comprise:
determining a capacity based on an utilization of the first wireless service over the first wireless channel; and
determining that the capacity is insufficient to satisfy the demand for the real-time service to the first mobile device, wherein the handover of the selected mobile device to the second radio increases the capacity of the first wireless channel to support a provision of the real-time service to the first mobile device.

11. The system of claim 8, wherein the real-time service comprises conversational voice.

12. The system of claim 8, wherein the second radio does not support an enhanced 911 emergency service to any mobile devices within the cellular region.

13. The system of claim 8, wherein the first mobile device comprises a cellular phone.

14. The system of claim 8, wherein at least one of the one or more non-real-time mobile devices comprises a tablet.

15. A non-transitory machine-readable storage medium comprising executable instructions that, when executed by a processor, facilitate performance of operations, the operations comprising:
determining a demand for real-time service to a first mobile device, the real-time service being by way of a base station of an Evolved Universal Terrestrial Radio Access (E-UTRA) radio access network, wherein the demand for the real-time service is determined according to determination of packet type;

responsive to the determining of the demand for the real-time service, evaluating a utilization of a first wireless channel of a first radio of the base station, wherein the first radio facilitates support of a first wireless service over the first wireless channel that includes the real-time service within a cellular region, wherein the first radio provides a non-real-time service over the first wireless channel to a plurality of mobile devices within the cellular region, and wherein the evaluating of the utilization of the first wireless channel comprises identifying a physical resource block allocation associated with one or more non-real-time mobile devices of the plurality of mobile devices;

responsive to the evaluating of the utilization of the first wireless channel, selecting one of the one or more non-real-time mobile devices as a selected mobile device; and responsive to the evaluating of the utilization of the first wireless channel, facilitating a handover of the selected mobile device to a second radio of the base station, wherein the second radio facilitates support of a second wireless service that excludes the real-time service over a second wireless channel within the cellular region, and wherein, responsive to the handover, the second radio supports the non-real-time service over the second wireless channel to the selected mobile device within the cellular region.

16. The non-transitory machine-readable storage medium of claim 15, wherein the operations further comprise:
identifying a portion of the physical resource block allocation associated with another mobile device of the one or more non-real-time mobile devices; and
reducing the portion of the physical resource block allocation associated with the another mobile device of the one or more non-real-time mobile devices to obtain a modified physical resource block allocation, wherein the modified physical resource block allocation comprises an increase in available capacity of the first wireless channel to support a provision of the real-time service to the first mobile device.

17. The non-transitory machine-readable storage medium of claim 15, wherein the operations further comprise:
determining a capacity based on an utilization of the first wireless service over the first wireless channel; and
determining that the capacity is insufficient to satisfy the demand for the real-time service to the first mobile device, wherein the handover of the selected mobile device to the second radio increases the capacity of the first wireless channel to support a provision of the real-time service to the first mobile device.

18. The non-transitory machine-readable storage medium of claim 15, wherein the second radio does not support an enhanced 911 emergency service to any mobile devices within the cellular region.

19. The non-transitory machine-readable storage medium of claim 15, wherein the first mobile device comprises a cellular phone.

20. The non-transitory machine-readable storage medium of claim 15, wherein at least one of the one or more non-real-time mobile devices comprises a tablet.

* * * * *